May 9, 1933.  F. X. LAUTERBUR ET AL  1,907,836
PROCESS OF MIXING DOUGH
Filed June 13, 1930
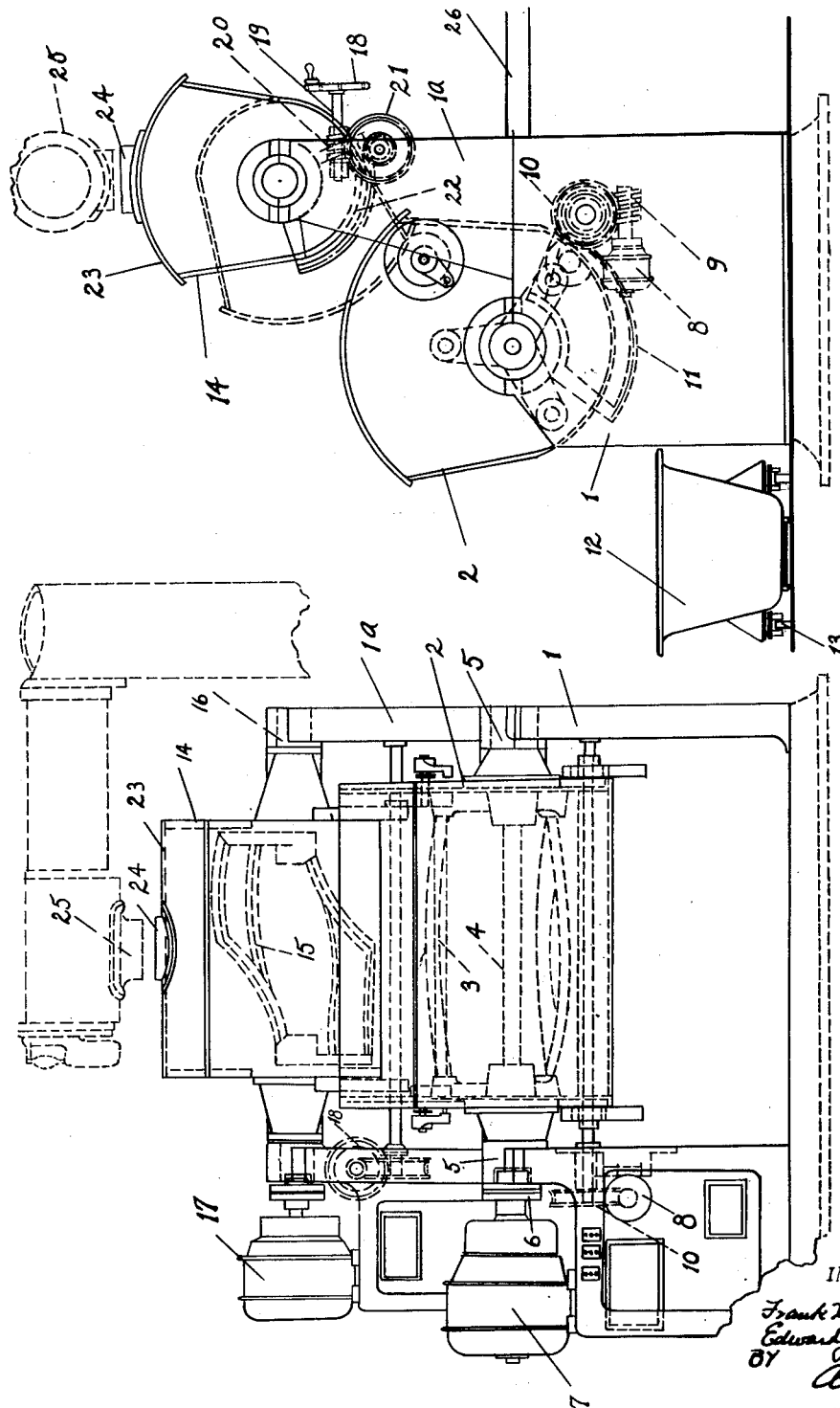
INVENTOR.
Frank X. Lauterbur
Edward J. Lauterbur
BY
Allen Allen
ATTORNEYS Patented May 9, 1933

1,907,836

UNITED STATES PATENT OFFICE

FRANK X. LAUTERBUR AND EDWARD J. LAUTERBUR, OF SIDNEY, OHIO

PROCESS OF MIXING DOUGH

Application filed June 13, 1930. Serial No. 461,015.

Our invention relates to dough mixing processes, and particularly to mixing apparatus for treating special kinds of dough.

In preparing doughs for baked goods very often different treatments are necessary. Some of the ingredients may first require a thorough mixing or beating and frothing up, as, for example in making up different kind of doughs. Then after a more or less violent agitation of some of the ingredients, flour and other ingredients are incorporated into the dough, and in order to prevent undue friction, and in order to properly develop the gluten in the flour, it may then be necessary to increase or reduce the speed of the agitator or make other changes in the manner in which the ingredients are further treated. If it is attempted to make the entire batch in one mixer, while the type of agitation may be desirable for part of the treatment, it may be undesirable for properly treating subsequent stages of mixing. The gluten may not be properly developed and unsatisfactory work will be done. If the type of agitation is proper for developing the gluten and avoiding undue friction, this type of agitation will not be satisfactory for the amalgamation of the ingredients in the first stage.

It is the object of our invention to provide dough mixing apparatus in which a plurality of mixing machines are associated in such manner, and in which the type of agitation within the mixers is such that parts of the ingredients may be mixed in certain of the mixers, then discharged into other mixers which are provided with different types of agitation, and in which further treatment of the mixtures is carried out.

It it an object of our invention to mount the mixers in such relative positions that the different ingredients may be treated to best advantage and then dropped by gravity into other mixers for further treatment.

It is further our object to provide a process for treating doughs in which certain of the ingredients are mixed in a mixer particularly adapted for the treatment of such parts of the ingredients as are given a preliminary mixing, and in which the mixed ingredients noted are then given a further mixing treatment in which other ingredients are incorporated in which the type of agitation is varied in accordance with the particular requirements of the particular type of dough being made.

The above objects and other objects to which reference will be made in the ensuing disclosure we accomplish by that certain combination and arrangement of parts and by carrying out the process in the manner which will hereinafter be described.

Referring to the drawing:

Figure 1 is a side elevation of a preferred combination of mixers.

Figure 2 is an end elevation of the combination of parts shown in Figure 1.

Mounted in a supporting frame 1 we have shown the dough mixer bowl 2 having an agitator 3 mounted on a shaft 4 which is journaled in the bearings 5. Through suitable gearing 6 a motor 7 rotates the shaft of the agitator. An independent motor 8 carries a worm gear 9 which meshes with another worm 10 which engages the teeth of a segment 11 which is fixedly connected with the bowl wall so that when the electric motor 8 is rotated, the bowl will be rocked from running to discharging position. We have shown a trough 12 mounted on casters 13 which may be positioned so as to receive the mixed batch.

The agitator shown forms the subject matter of our patent for dough mixers, #1,726,033, and is particularly designed because of its fitness for developing the gluten in a dough batch without undue friction, and while still being mixed at a high rate of speed.

Mounted on an extension 1a of the frame support 1 we have shown another rocking bowl 14 having an agitator 15 mounted on a shaft 16 therein which is rotated by means of an electric motor 17. For rocking the bowl 14 we have shown a hand wheel 18 which is mounted on a shaft 19 carrying a worm gear 20 which engages another worm 21. The rotation of the gear 21 rocks the segment 22, causing the bowl to be tilted from the position shown to the position shown in dotted lines in Figure 2.

The cover 23 of the bowl 14 has a receiving orifice 24 through which the different ingredients going into the dough batch may feed from the dispensing hopper 25. A platform 26 is indicated on which an operator may stand and inspect the ingredients in the bowl 23.

In carrying out the process of mixing different parts of the ingredients with different types of agitation, we will give an example of manufacturing a dough. Certain or all of the yolks of the ingredients may first be disposed in the bowl 14 and mixed with the agitator 15, which may be of any form suitable for best amalgamating the mass. The agitation is continued for a suitable period to thoroughly incorporate various ingredients. The entire contents is then discharged into the bowl 2 and the agitator 3 rotated for a desired period to develop the gluten sufficiently without injuring the dough by excessive friction or agitation as might occur if the same type and speed of agitator were used for both the amalgamation of ingredients and the development of the mass. After the batch is finished it may be discharged into the trough and handled in the ordinary manner.

It is apparent that in cake work as well as in dough development, the treatment of the batch at various stages varies to such a degree as to make the combination of the two or more mixers with properly designed agitators or beaters operated at different speeds highly desirable.

While we have only shown one combination of mixers, and have only described one example of our dough mixing process, modifications of the particular arrangement shown and of the steps in the process will occur to those skilled in the art without departing from our invention.

While one batch of ingredients is being mixed in one of the mixers, another batch may be finished up in the other of the mixers so that the output of one mixer need not be dependent on the work being done in another.

Having thus described our invention, what we claim as new and desire to secure by Letters Patent, is:—

1. The process of mixing dough which consists in mechanically mixing part of the ingredients of the dough with a type of agitation particularly adapted to properly mix the said part of the ingredients and then adding other ingredients and mechanically mixing the dough batch with a different type of agitation.

2. The process of mixing dough which consists in first imparting to ingredients of the dough a type of agitation adapted particularly for amalgamating the ingredients, and then imparting to the amalgamated ingredients a type of agitation adapted particularly for developing a stiffness of the dough while minimizing friction due to the development.

3. The process of mixing dough which consists in first imparting to part of the ingredients of the dough a type of agitation adapted particularly for amalgamating the ingredients, and then adding an ingredient to the amalgamated ingredients and imparting to the amalgamated ingredients and the added ingredient a type of agitation adapted to incorporate the added ingredient in the mixture and also adapted particularly for developing a stiffness of the dough while minimizing friction due to the development, thereby, with the aid of the cooling effect of the added ingredient, minimizing heating during said development.

4. The process of mixing dough which consists in first imparting to part of the ingredients of the dough a type of agitation adapted particularly for amalgamating the ingredients, and then adding ingredients including flour to the amalgamated ingredients and imparting to the amalgamated ingredients and flour a type of agitation adapted to incorporate the flour in the mixture and also adapted particularly for developing the stiffness of the gluten of the flour while minimizing friction due to the development.

5. The process of mixing dough which consists in first imparting to part of the ingredients of the dough a type of agitation adapted particularly for amalgamating the ingredients, and then adding ingredients including flour and a cooling material to the amalgamated ingredients and imparting to the amalgamated ingredients and added ingredients a type of agitation adapted to incorporate the added ingredients in the mixture and also adapted particularly for developing the stiffness of the gluten of the flour while minimizing the friction due to the development, thereby with the aid of the cooling effect of the cooling material, minimizing heating during the development.

FRANK X. LAUTERBUR.
EDWARD J. LAUTERBUR.